(12) United States Patent
Ito et al.

(10) Patent No.: US 6,787,500 B2
(45) Date of Patent: Sep. 7, 2004

(54) CATALYST PARTICLES AND METHOD OF MANUFACTURING THE SAME

(75) Inventors: Miho Ito, Kariya (JP); Jun Hasegawa, Kariya (JP); Koichi Niihara, 608, 18-1, Yamadahigashi 3-chome, Suita-shi, Osaka (JP); Tadachika Nakayama, Shimada-haitsu 201, 1-13, Onoharahigashi, 3-chome, Minoo-shi, Osaka (JP)

(73) Assignees: Denso Corporation, Kariya (JP); Koichi Niihara, Osaka (JP); Tadachika Nakayama, Osaka (JP)

(*) Notice: Subject to any disclaimer, the term of this patent is extended or adjusted under 35 U.S.C. 154(b) by 0 days.

(21) Appl. No.: 10/185,355

(22) Filed: Jun. 27, 2002

(65) Prior Publication Data

US 2003/0004054 A1 Jan. 2, 2003

(30) Foreign Application Priority Data

Jun. 29, 2001 (JP) .......................................... 2001-199129
Apr. 19, 2002 (JP) .......................................... 2002-117587

(51) Int. Cl.$^7$ ........................ B01J 21/18; B01J 27/224; B01J 23/00; B01J 23/58; B01J 23/42
(52) U.S. Cl. ........................ 502/180; 502/178; 502/182; 502/304; 502/325; 502/330; 502/332; 502/333; 502/334; 502/305; 502/339; 502/340
(58) Field of Search ................................ 502/180, 182, 502/178, 304–355

(56) References Cited

U.S. PATENT DOCUMENTS

| | | | | |
|---|---|---|---|---|
| 4,537,873 A | * | 8/1985 | Kato et al. | 502/242 |
| 4,793,797 A | * | 12/1988 | Kato et al. | 431/7 |
| 6,261,989 B1 | * | 7/2001 | Tanaka et al. | 502/217 |
| 6,624,112 B2 | * | 9/2003 | Hasegawa et al. | 502/339 |
| 2003/0134741 A1 | * | 7/2003 | Weisbeck et al. | 502/243 |

FOREIGN PATENT DOCUMENTS

| | | | |
|---|---|---|---|
| EP | 0488347 A1 | 6/1992 | |
| JP | 63190644 | * 8/1988 | ............ B01J/23/56 |
| JP | A-4-200637 | 7/1992 | |
| JP | A-2000-15098 | 1/2000 | |
| JP | A-2000-510042 | 8/2000 | |
| WO | WO97/43042 | 11/1997 | |

* cited by examiner

Primary Examiner—Mark L. Bell
Assistant Examiner—Patricia L. Hailey
(74) Attorney, Agent, or Firm—Harness, Dickey & Pierce, PLC

(57) ABSTRACT

Catalyst particles having a higher activity and capable of showing activities for a plurality of kinds of material are provided.

The catalyst particles of the invention comprise base particles that consist of one kind of single material fine particles or two or more kinds of solid solution fine particles having primary particle diameters of a nanometer order, and a surface coating layer made of one or more kind of noble metal, or an oxide of noble metal, that covers at least a part of the surface of the base particles 1 to a thickness of one to thirty single atom layers.

17 Claims, 3 Drawing Sheets

CATALYST PARTICLES AND METHOD OF MANUFACTURING THE SAME

BACKGROUND OF THE INVENTION

1. Field of the Invention

The present invention relates to catalyst particles used in the purification of automobile exhaust gas, in fuel cells and in environment conservation and, more particularly, to catalyst particles having sizes of a nanometer order.

2. Description of the Related Art

Noble metals such as Pt, Pd and Rh are used, for example, as catalysts for removing toxic components such as HC, CO and NOx from the exhaust gas of an automobile. These catalytic noble metals are supported in the form of particles on the surface of a support such as alumina, in order to increase the area of contact with the exhaust gas to thereby remove the toxic components.

Recently, as the regulations on the automobile exhaust gas have become increasingly demanding, the exhaust gas purifying catalysts are required to remove the toxic components more efficiently. On the other hand, as the catalysts for fuel cells (for example, the catalysts for the reaction of hydrogen and oxygen and the catalysts for reforming methanol) and the catalysts for environment purification are required to have improved purification performance and functions, there have been increasing demands for catalysts having higher catalytic activity.

Measures to improve the efficiency of a noble metal catalyst include increasing the contact area with toxic components by forming the noble metal catalyst as fine particles. However, conventional methods of supporting the catalyst only allow noble metal particles having sizes of submicron order (several hundreds of nanometers), impeding further improvements in the specific surface area of the catalyst. Thus there is increasing demand for fine particles of noble metal catalyst having sizes of nanometer order (the term "nanometer order" refers to sizes below about 100 nm).

With the background described above, significant efforts have been made for the development of noble metal particles of nanometer order size, that have a larger contact area, in order to improve the activity further. For example, Published Japanese Translations of PCT International Publication No. 2000-510042 discloses a constitution of noble metal particles of nanometer order size supported on $\gamma Al_2O_3$ by a sputtering process. Japanese Unexamined Patent Publication (KOKAI) No. 2000-15098 discloses a constitution where fine particles having sizes of 20 nm or less are supported on a support made of $Al_2O_3$ or the like by concurrent electron beam irradiation.

According to the Publications mentioned above, although the fine noble metal particles of nano-order size can be deposited on the support, no specific description is given as to the surface condition of the noble metal fine particles (particle shape, specificity, etc.).

Moreover, the gas purifying catalysts generally have activities to selectively decompose particular types of toxic substances, rather than universal activity to decompose many toxic substances. Accordingly, when exhaust gas including many types of toxic substances must be neutralized effectively, various types of catalyst may be selected for the toxic substances of interest and used in combination. However, there is no description of the combination of catalysts in the Publications mentioned above.

SUMMARY OF THE INVENTION

In consideration of the problems described above, the present invention has an object of providing catalyst particles having higher catalytic activities that are effective for a plurality of types of substance, and a method of manufacturing the catalyst particles.

In order to achieve the object described above, a first aspect of the invention provides catalyst particles that comprise base particles (1) that consist of one kind of single material fine particles or two or more kinds of solid solution fine particles having a primary particle diameter of a nanometer order, and one or more kind of a metal or a derivative thereof that covers at least a part of the base particles.

The primary particle size refers to the diameter of a single particle. One kind of single material fine particles refers to fine particles made of one kind of element or compound. Two or more kinds of solid solution fine particles refer to fine particles made of two or more kinds of element or compound forming a solid solution. The term solid solution used in the present invention includes the state of substances A and B being mixed, and the state of substances A and B forming a new structure through reaction with each other.

The catalyst particles of the present invention comprise the base particles having sizes of a nanometer order and one or more kind of metal, or a derivative thereof, that covers at least a part of the surface of the base particles.

Thus it is made possible to form the single catalyst particle having a size of a nanometer order (about 100 nm or smaller), resulting in larger specific surface area and higher activity than those of the simple noble metal particles of nano-order size of the prior art.

According to the invention, as the base particles can provide catalytic activity while the base particles and the one or more kind of metal or derivative thereof can be selected so that both components show catalytic activities for different substances, catalytic activities for a plurality of substances can be achieved with one type of catalyst particle. Therefore, the invention can provide catalyst particles that have higher activity and are capable of showing activity for a plurality of substances.

The base particles (1) can be selected from among metal oxides, metal carbides and carbon materials. Specifically, the metal oxide may be either one kind of single material fine particles selected from among oxides of Ce, Zr, Al, Ti, Si, Mg, W and Sr and derivatives thereof, or two or more kinds of solid solution. The metal carbide may be SiC or a derivative thereof. The carbon material may be graphite. The metal oxide may be expressed as MxOy, where M represents the metal while x and y represent variable values.

The one or more kind of metal, or a derivative thereof, that covers at least a part of the base particles (1) may be used in the form of either particles or layer. In the case of particles, they are preferably ultra-fine particles of 50 nm or less in diameter. Particle size of 50 nm or larger makes it difficult to cover the surface of the base particles of a nanometer size.

In the case of layer, on the other hand, it is preferable to form a coating film (2) comprising one to thirty single atom layers. When the surface coating layer consists of more than 30 single atom layers, it is difficult to keep the size of a single catalyst particle within nanometer order, or the surface coating layer itself becomes like a particle, thus resulting in a smaller specific surface area.

The one or more kind of metal, or a derivative thereof, that covers at least a part of the base particles (1) has purity of preferably 99% or higher.

Furthermore, it is preferable that a part, not the entire surface, of the base particles (1) is covered by the one or more kind of metal or a derivative thereof. This constitution makes it possible to effectively utilize the characteristics of the base particles on the surface of the base particles exposed without being coated with the one or more kind of metal, or a derivative thereof, in a case where the base particles have catalytic activity.

For the one or more kinds of metal, or a derivative thereof, one kind of single material fine particles selected from among noble metals such as Pt, Rh, Pd, Au, Ag and Ru and oxides thereof, or two or more kinds of solid solution, can be used.

In case the catalyst particles are used at a high temperature of around 1000° C. in an application such as purification of exhaust gas, sintering of the particles may be caused by the heat thus resulting in a decreased surface area that has reactivity, due to bonding of particles with each other and/or mobilization of the surface coating layer that causes coagulation into coarse particles.

A second aspect of the invention aims at solving the problem of sintering, and provides a constitution of the catalyst particles described in the first aspect of the invention where the base particles (1) have, on the surface thereof, an anti-sintering agent (3) made of a metal or a metal oxide having melting point of 1500° C. or higher.

The anti-sintering agent may be present either on the surface of the one or more kind of metal or a derivative thereof that covers the base particles, or on the surface of the base particles not covered by the one or more kind of metal or a derivative thereof.

According to the invention, as the base particles have, on the surface thereof, the anti-sintering agent that remains stable even when used at a high temperature near 1500° C., the catalyst particles that have excellent durability against high temperature can be made, while preventing the bonding of particles with each other and the bonding of the one or more kind of metal or derivative thereof, thereby mitigating the decrease in the specific surface area that has reactivity.

In order to make the catalyst particles each having a size of a nanometer order, it is preferable to form the anti-sintering agent (3) in a layer having a thickness of one to thirty atom layers, or as ultra-fine particles having diameters smaller than 50 nm.

The anti-sintering agent (3) may be either one kind of single material selected from among oxides of Al, Mg, Ca, Ce, Sr, Zn, W and Mo and derivatives thereof, or a solid solution composed of two or more kinds of the single material.

It is preferable to include the anti-sintering agent (3) in a proportion of 1 to 20% by weight of the one or more kind of metal or a derivative thereof that covers at least a part of the base particles (1). When the proportion is less than 1% by weight, sufficient effect of the anti-sintering agent cannot be achieved. When the proportion is more than 20% by weight, the specific surface area having catalytic activity is greatly decreased by the presence of the anti-sintering agent.

A third aspect of the invention is a method of manufacturing the catalyst particles described above, where two or more kinds of raw materials are evaporated at the same time in a vacuum chamber (10), so as to form the base particles (1) that are covered, on at least a part of the surface thereof, with the one or more kind of metal or a derivative thereof.

The catalyst particles described above can be satisfactorily manufactured by employing a simultaneous evaporation process such as the manufacturing method of the invention.

It is preferable to place an evaporation source (18b) of the raw material that makes the one or more kind of metal or a derivative thereof at a position higher than an evaporation source (18a) of the raw material that makes the base particles (1) in the vacuum chamber (10). This enables the one or more kind of metal or derivative thereof to grow hetero-epitaxially on the base particles that are formed earlier upon being evaporated at a lower position.

It is preferable to evaporate the raw materials by resistive heating method in order to improve mass-producibility and crystallinity of the material.

The numerals given in parentheses for the means described above represent an example of correspondence to specific means in the preferred embodiments described later.

DETAILED DESCRIPTION OF THE PREFERRED EMBODIMENTS

Figure 1:
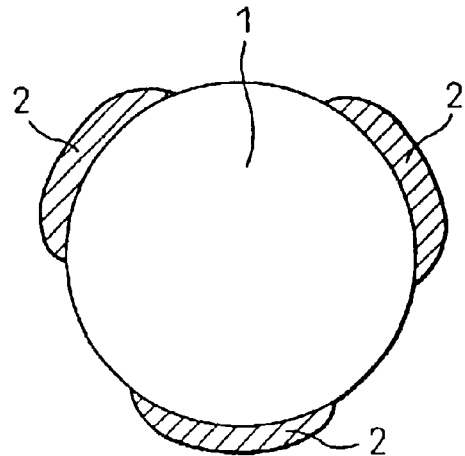
FIG. 1 schematically shows the catalyst particles according to a preferred embodiment of the invention.

Now preferred embodiments of the present invention depicted in the accompanying drawings will be described below. FIG. 1 is a drawing schematically showing the catalyst particles according to a preferred embodiment of the invention. In FIG. 1, numeral 1 denotes a base particle that is one kind of single material fine particle or solid solution fine particles composed of two or more kinds of the single material having a primary particle size of a nanometer order (hereinafter referred to as nano-order).

In connection to the base particle 1, the term one kind of single material fine particles refers to fine particles made of one kind of material such as ceramic or metal element or compound. The term solid solution fine particles composed of two or more kinds of the single material refers to fine particles made of two or more kinds of materials such as ceramic, metal element or a compound forming a solid solution.

The base particles can be selected from among metal oxides, metal carbides and carbon material. Specifically, the metal oxide may be either one kind of single material fine particles selected from among oxides of Ce, Zr, Al, Ti, Si, Mg, W and Sr and derivatives thereof, or two or more kinds of solid solution. The metal carbides may be SiC or a derivative thereof. The carbon material may be graphite.

There is no limitation to the method of manufacturing the base particles 1 that are fine particles of a nano-order and a coprecipitation process, a sol-gel method or a plating process may be employed. There is also no limitation to the properties and composition of the two or more kinds of solid solution fine particles, and the properties and composition of the two or more kinds of solid solution may be determined so as to achieve high a temperature characteristic, durability and a purifying performance.

According to this embodiment, the surface of the base particles 1 is at least partially covered with one or more kind of metal or a derivative thereof. The one or more kind of metal or a derivative thereof may be a noble metal or an oxide of a noble metal that has a catalytic function.

The one or more kind of metal or derivative thereof is deposited on the surface of the base particles 1 in the form of ultra-fine particles having particle size below 50 nm, or deposited on the surface of the base particles 1 in the form of coating layer having a thickness of 1 or more single atom layers. Catalyst particles of high activity can be made by covering the base particles 1 of nano-order size with ultra-fine particles or a coating layer as described above. It is thought that this effect is achieved for the following reason.

As a smaller particle size results in a larger specific surface area, the number of catalytically active sites increase thus making the catalyst particles more active. Therefore, a conventional level of catalyst performance can be achieved even when the quantity of catalyst is decreased.

The benefit of this embodiment will be described below by way of an example where cerium oxide (ceria) is used as the base particle and Pt I used as the ultra-fine particles deposited on the base particles, with the resultant catalyst particles being used for an exhaust gas purifying filter for automobiles.

Ceria that makes the base particles has oxygen occlusion and release function, and turns to $CeO_2$ as Ce is oxidized to have ionic valence of 4+ when the exhaust gas includes a high oxygen concentration. When the oxygen concentration is low, Ce is reduced to have ionic valence of 3+ and form $CeO_{3/2}$.

It is considered that ceria can more easily take in and release oxygen in the form of dissociated atom O than in the form of molecular $O_2$. The catalyst Pt is thought to assist the dissociation of oxygen. As a result, ceria would be able to take in and release oxygen more quickly with higher oxygen occlusion and release function, when the assist catalyst and the catalyst are located in closer proximity.

From the discussion described above, it can be seen that the catalyst particles made by depositing the ultra-fine particles or the coating layer on the base particles of nano-order size not only have high specific surface area and high activity, but also can quickly accommodate changes in the oxygen concentration in the exhaust gas.

While the catalyst particles having high activity can be made by depositing the ultra-fine particles of sizes less than 50 nm on the surface of the base particles 1 made of ceria or the like, the catalyst particles having even higher activity can be made by forming a catalyst layer having thickness of several atoms that covers the surface of the base particles made of a crystalline material such as ceria.

The effect described above is achieved because the catalyst layer having thickness of several single atom layers formed on the surface of the base particles 1 has a lattice structure that reflects the crystalline structure of the base particles. That is, when the surface of the base particle 1 is covered with the layer made of the one or more kind of metal or derivative thereof, the crystal structure formed is different from that of the lattice structure that would be achieved in case the catalyst is present only in the form of ultra-fine particles, thus changing the electron state and increasing the catalytic activity.

For this reason, at least a part of the surface of the base particles 1 is covered with the surface coating layer 2 in the example shown in FIG. 1. While this embodiment will be described below by taking the example shown in FIG. 1, features described below apply also to a case where the surface coating layer 2 is replaced by the ultra-fine particles that cover the surface of the base particles 1.

The surface coating layer 2 covers the surface of the base particles 1 in a thickness of one to thirty single atom layers and is made of one or more kinds of noble metals or oxides of noble metals. The surface coating layer 2 may be made of one or more kind of single material selected from among noble metals such as Pt, Rh, Pd, Au, Ag and Ru and oxides thereof, or two or more kinds of solid solution can be used.

The surface coating layer 2 having a thickness of one to thirty single atom layers is very dense and has high crystallinity, without lattice defects with a low impurity content. It is preferable that the purity of the one or more kind of noble metal or oxide of noble metal that constitutes the surface coating layer is 99% or higher. The property and purity of the surface coating layer 2 can be determined by means of TEM image, element analysis or the like.

While the surface coating layer 2 can be formed by a concurrent evaporation process, a coprecipitation process, a sol-gel method or a plating process, the concurrent evaporation process is capable of forming a uniform compound of nanometer level and is advantageous.

As described above, the catalyst particles of this embodiment comprise the base particles 1 having nano-order size as a support of which surface is at least partially covered with the thin coating layer 2 that has a catalytic function and a thickness in a range from one to thirty single atom layers (several nanometers).

As a result, the catalyst particle having a size of nano-order (about 100 nm or smaller) including the surface coating layer 2 can be made, and larger specific surface area and higher activity can be achieved than those of the simple noble metal particles of nano-order size of the prior art.

When the surface coating layer 2 is thicker than thirty single atom layers, it becomes difficult to keep the size of the catalyst particle to a nanometer order, and/or the surface coating layer 2 itself becomes particle-like resulting in smaller specific surface area which is undesirable.

Thickness of the surface coating layer 2 will be described in more detail below by taking Pt as an example. The distance between single atom layers of Pt is about 0.2 nm while being slightly different depending on the direction of crystal plane. According to this embodiment, while it is preferable to form the surface coating layer 2 by the concurrent evaporation process, that is a gas phase process as described above, the surface coating layer 2 being thirty single atom layers or thicker means that the Pt layer is 6 nm or thicker.

Experiences show that it is difficult to stack more than thirty single atom layers by the concurrent evaporation process, and a thicker layer not only leads to less effect of the surface coating layer 2 to reflect the crystal structure of the base particle 1, but also makes the property of the catalyst particles prominent, thus losing the merit of providing the surface coating layer. For these reasons, the thickness of the surface coating layer 2 is controlled within the range from one to thirty single atom layers.

If the catalyst is used in the form of ultra-fine particles, the particle size is preferably 50 nm or less. This is because a particle size of 50 nm or more is too large to cover the surface of the base particles having the size of a nanometer order.

According to this embodiment, the base particles may also have catalytic activity so that the base particles 1 and the surface coating layer 2 can have catalytic activities for different materials and, therefore, catalytic activities for a plurality of materials can be provided with one kind of catalyst particle.

For the reasons described above, catalytic functions can be improved through mutual enhancement and catalyst particles having high activities to decompose a plurality of toxic materials can be made, although the specific mechanism is not known.

Specific combinations of the surface coating layer 2 and the base particles 1 that are coated therewith, of which catalytic functions can be improved through mutual enhancement include fine $CeO_2$ particles coated with Pt, fine particles of $CeO_2$—$ZrO_2$ solid solution coated with Pt, fine $TiO_2$ particles coated with Au and fine carbon particle coated with Pt.

Thus according to this embodiment, the catalyst particles having higher activities, and that are effective for a plurality of materials, can be provided.

Moreover, according to this embodiment, it is preferable that a part of the surface of the base particles 1, not the entire surface thereof, is coated with the surface coating layer 2. When this constitution is employed, if the base particles 1 are not mere support but have catalytic activity, this property of the base particles 1 can be utilized through the surface of the base particles 1 that is exposed without being covered by the surface coating layer 2.

In case the catalyst particles of this embodiment comprise the $CeO_2$ base particles 1 coated with Pt (surface coating layer 2), for example, the catalyst particles can be used as exhaust gas purifying catalyst for automobiles, as described previously. In this case, while Pt used in the surface coating layer 2 functions as a catalyst for oxidation of HC or reduction of NOx, $CeO_2$ makes the base particles 1 function as an assist catalyst that absorbs and releases oxygen.

As a result, $CeO_2$ releases or absorbs oxygen in accordance to excess or shortage of oxygen in the ambient atmosphere (exhaust gas) of the catalyst. Thus the atmosphere for oxidizing HC or reducing NOx can be achieved as required, thereby achieving satisfactory exhaust gas purification.

Figure 2:
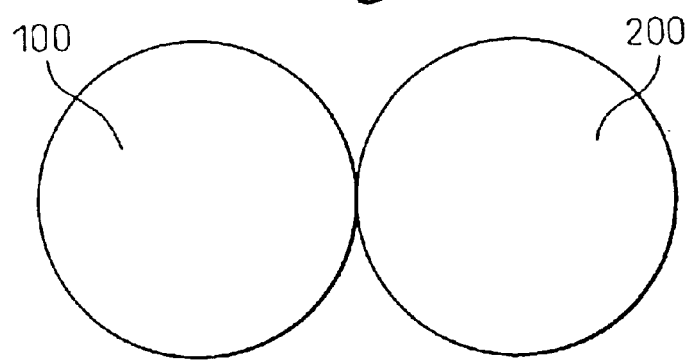
FIG. 2 schematically shows the catalyst particles of a Comparative Example.

While it is considered that such a function is performed effectively in the boundary between $CeO_2$ and Pt, coating a part of the $CeO_2$ particles that constitute the base particles 1, not the entire surface thereof, with the Pt layer that constitute the surface coating layer 2 as shown in FIG. 1, makes it possible to make the area of the boundary region larger than that of the constitution where the $CeO_2$ particles 100 and the Pt particles 200 shown in FIG. 2 are simply mixed so as to contact each other.

The proportion of the surface of the base particles 1 covered with the surface coating layer 2 in this embodiment can be determined by means of a TEM image or the like. According to research by the inventors of the present application, it is preferable to cover 0.5 to 60% of the surface of the base particles 1.

If the catalyst particles are used at a high temperature of around 1000° C. in an application such as purification of exhaust gas, the particles may be sintered by the heat, resulting in decreased surface area that has reactivity, due to bonding of particles with each other and/or mobilization of the surface coating layer that causes coagulation into coarse particles.

Figure 3:
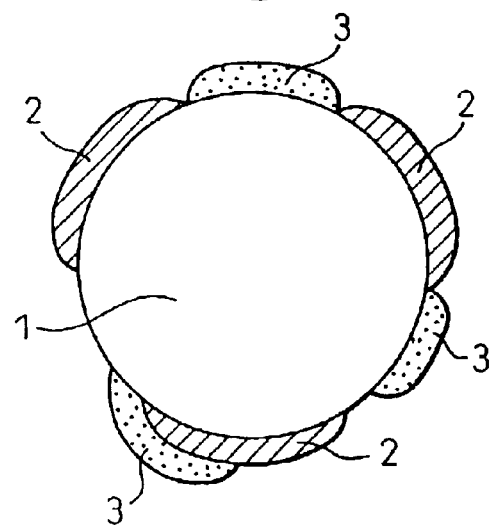
FIG. 3 schematically shows the catalyst particles provided with an anti-sintering agent according to the preferred embodiment.

In this embodiment, the problem of sintering is solved with such a constitution that the base particles 1 have, on the surface thereof, a anti-sintering agent 3 made of a metal of a metal oxide having melting point of 1500° C. or higher. The catalyst particle of this embodiment having the anti-sintering agent 3 is schematically shown in FIG. 3.

The anti-sintering agent 3 may be present either on the surface of the surface coating layer 2, or on the surface of the base particles 1 not covered by the surface coating layer 2. The anti-sintering agent 3 may be either one kind of single material selected from among oxides of Al, Mg, Ca, Ce, Sr, Zn, W and Mo and derivatives thereof, or two or more kinds of solid solution fine particles.

The anti-sintering agent 3 is expected to perform two functions. One is to impede sintering of the surface coating layer 2 or the ultra-fine particles on the base particles 1, thereby to mitigate the decrease in the specific surface area at high temperatures. Another is to impede sintering the base particles 1 with each other, thereby to mitigate the decrease in the specific surface area at high temperatures.

When there is the anti-sintering agent 3 on the surface of the base particles 1 as described above, the specific surface area having catalytic activity in the early stage decreases somewhat, although the anti-sintering agent 3 remains stable on the base particles 1 even when used at a high temperature near 1500° C., and prevents the particles from bonding with each other and the surface coating layers from bonding with each other due to sintering, thereby to mitigate the decrease in the specific surface area and provide the catalyst particles having high-temperature durability.

It is preferable to form the anti-sintering agent 3 in one to thirty single atom layers, or in ultra-fine particles having diameters smaller than 50 nm. This is for the purpose of keeping the size of the catalyst particle at a nanometer order by limiting the layer thickness or the particle size of the anti-sintering agent 3.

It is preferable to include the anti-sintering agent 3 in a proportion from 1 to 20% by weight of the surface coating layer 2. When the proportion is less than 1% by weight, a sufficient effect of the anti-sintering agent 3 cannot be achieved. When the proportion is more than 20% by weight, the specific surface area having catalytic activity is greatly decreased by the presence of the anti-sintering agent 3.

Figure 4:
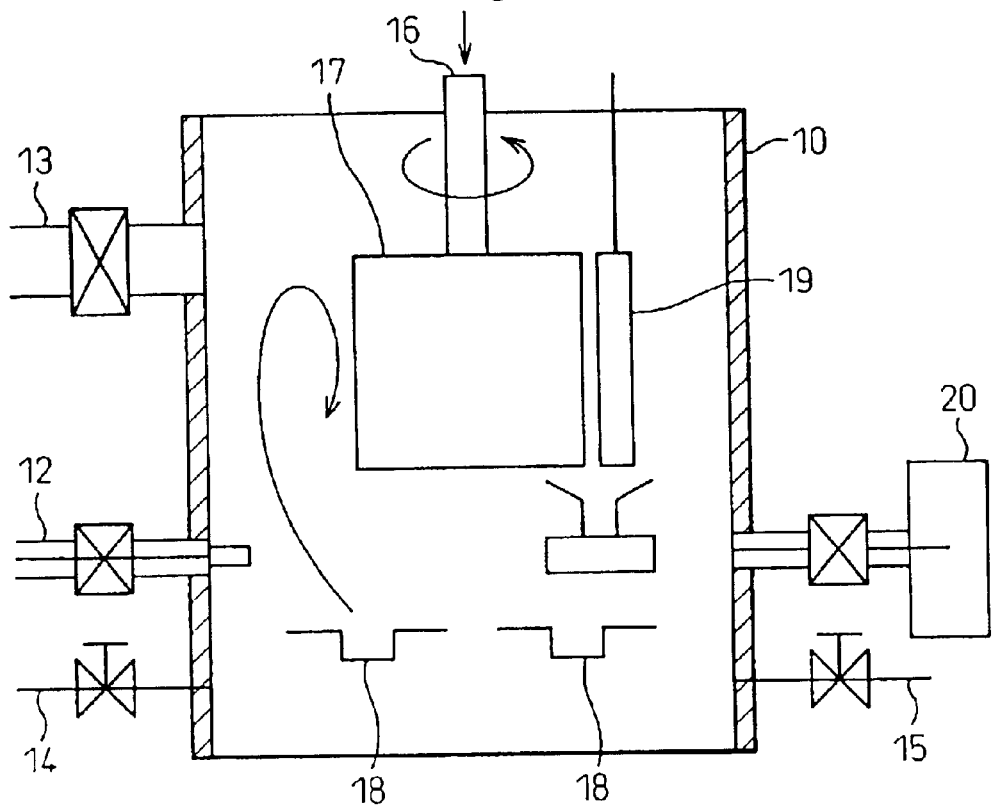
FIG. 4 is a schematic sectional view of a vacuum chamber used in simultaneous evaporation process employed for manufacturing the catalyst particles according to a preferred embodiment of the invention.

Now the method of manufacturing the catalyst particles of this embodiment comprising the $CeO_2$ (the base particles 1) coated with Pt (surface coating layer 2) by the concurrent evaporation process will be described below. FIG. 4 is a schematic sectional view of a vacuum chamber 10 used in the concurrent evaporation process.

First, a raw material is supplied though a material supply port 12 in a quantity about 1.5 times the required quantity, to an evaporation source (resistive heating boat) 18 located in the vacuum chamber 10. This quantity of material supply is determined as the yield of the material deposition is about 70% in this process.

The raw material may be either metal Ce and metal Pt or oxide $CeO_2$ and oxide $PtO_2$. In either case, purity of the raw material is preferably from 99% to 99.999%, and more preferably as high as from 99.9% to 99.999%. The raw material may be in the form of a tablet, a compressed powder or a sintered body.

Then the vacuum chamber is evacuated to $5.0 \times 10^{-8}$ Torr, more preferably $5.0 \times 10^{-9}$ Torr by means of a vacuum pump 13. This is followed by the introduction of a predetermined quantity of oxygen gas or helium gas through an O2 inlet port 14 and a He gas inlet port 15. Oxygen gas is introduced for the purpose of making an oxidizing atmosphere in the vacuum chamber 10 in order to oxidize the raw material or prevent the raw material from being reduced, and helium gas is introduced for the purpose of pressure adjustment.

Pressures of these gases are in a range from 0.01 to 100 Torr, preferably in a range from 0.1 to 10 Torr, and partial pressure of the oxygen gas is in a range from 0 to 70 mol %, preferably in a range from 10 to 30 mol %. These gases are kept at a constant pressure by operating the vacuum pump 13.

Then a cooling medium such as liquid nitrogen or liquid helium is supplied through a cooling medium inlet port 16 to a cylindrical substrate 17, so as to cool down the substrate 17. The substrate 17 is rotated by a motor or the like as indicated with an arrow in FIG. 4. Under this condition, one to four kinds of raw material are evaporated in the evaporation source 18 located in the vacuum chamber 10.

Figure 5:
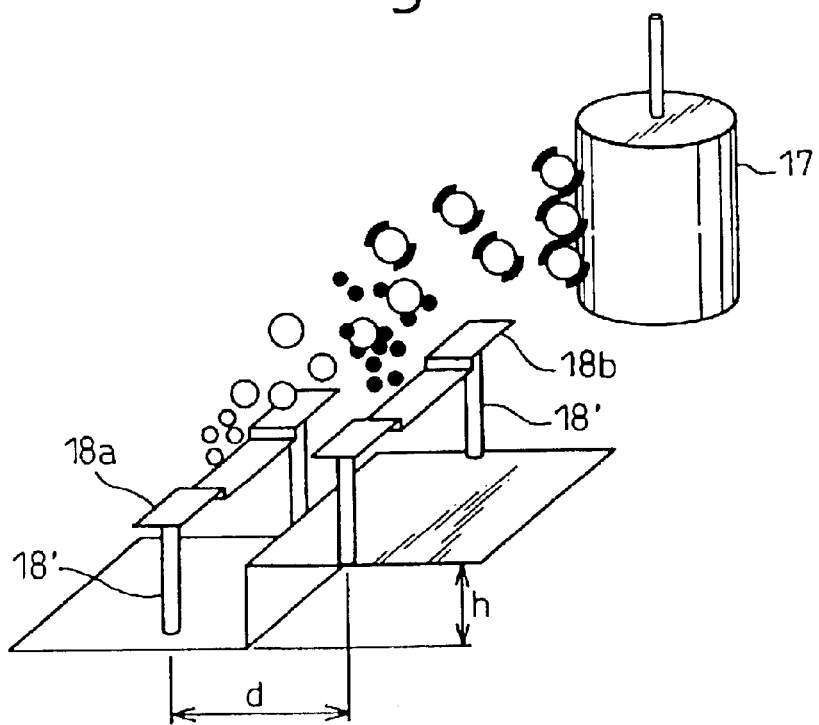
FIG. 5 shows the arrangement of evaporation sources in the vacuum chamber shown in FIG. 4.

The evaporation sources 18 (18a, 18b) are located in such an arrangement as shown in FIG. 5, where the evaporation source 18a made of the raw material such as $CeO_2$ that makes the assist catalyst (base particles 1) is placed via a support bar 18' below where the evaporation source 18b made of the raw material such as Pt that makes the catalyst (surface coating layer 2).

Relative positions of the evaporation sources (resistive heating boats) 18a, 18b shown in FIG. 5 are preferably such as vertical distance h is from 0 to 100 mm and horizontal distance d is from 0 to 50 mm.

While the position relative to the substrate 17 does not have much influence on the structure and properties of the materials, it is preferable that the evaporation source 18a for the assist catalyst (base particles) is placed further from the substrate 17 than the evaporation source 18b made for the catalyst (surface coating layer 2). Distances of the evaporation sources 18a, 18b from the substrate 17 are preferably from 10 mm to 200 mm, in order to achieve a high yield of deposition.

It goes without saying that these distances are heavily dependent on the shape of the vacuum chamber 10, and therefore must be optimized for the particular vacuum chamber used. By changing these distances, condensation of the evaporated raw materials can be changed so as to change the particle size.

The evaporation sources 18a, 18b may be evaporated by most physical evaporation processes such as resistive heating, induction heating, sputtering and laser ablation, while the resistive heating process is preferable in order to carry out mass production and improve the crystallinity of the material. This example employs the resistive heating process.

Figure 6A:
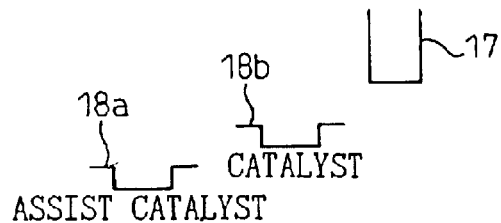
FIGS. 6(a) to 6(e) show various arrangements of the evaporation sources.
Figure 6B:
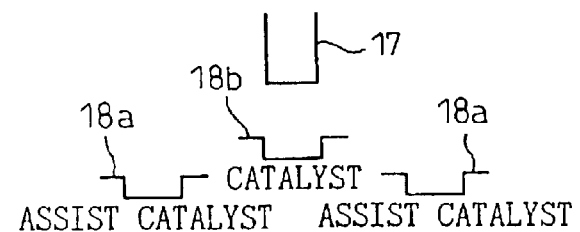
Figure 6C:
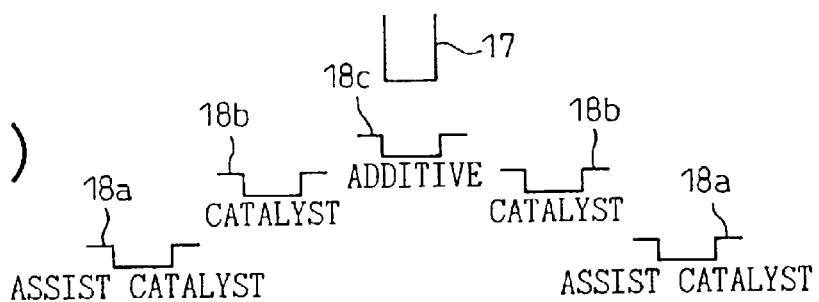
Figure 6D:
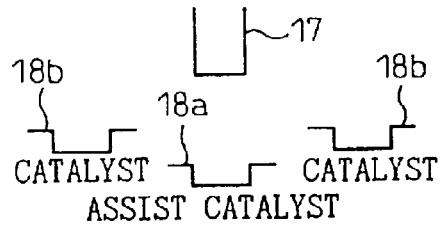
Figure 6E:
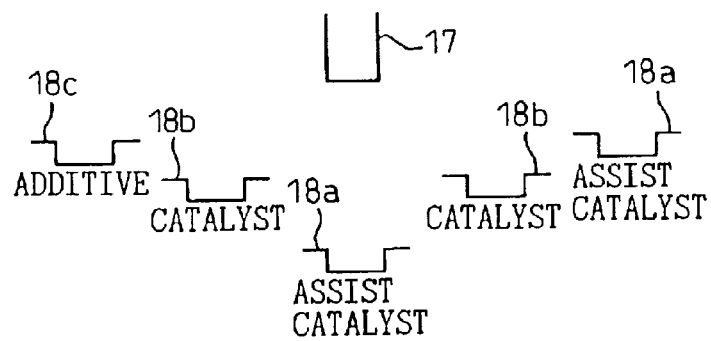

The evaporation sources 18a, 18b may also be located in various arrangements, as shown in FIGS. 6(a) to 6(e), and are not limited to the constitution of two evaporation sources. FIG. 6(a) shows an example of the constitution of two evaporation sources of this embodiment, FIG. 6(b) shows an example of the constitution of three evaporation sources and FIG. 6(c) shows an example of the constitution of five evaporation sources.

In FIG. 6(b) and FIG. 6(c), two evaporation sources 18a for the assist catalyst and two evaporation sources 18b for the catalyst may be different from each other. The evaporation source 18c for an additive shown in FIG. 6(c) may be used as the evaporation source for the raw material to make the anti-sintering agent 3. The arrangement shown in FIG. 6(d) or FIG. 6(e) may also be employed.

Thus the two or more kinds of raw materials evaporated simultaneously from the evaporation sources 18a, 18b located in the vacuum chamber 10 immediately mix with each other in the state of gas as shown in FIG. 5, so that a power of uniformly mixed compounds having nano-order sizes can be formed.

Even when metals such as Ce and Pt are used as the raw materials, these metals are immediately oxidized by the oxygen gas introduced into the vacuum chamber 10, and at least partially change into oxides such as $CeO_2$ and $PtO_2$.

By arranging the evaporation sources 18a, 18b as shown in FIG. 5 or in FIGS. 6(a) to 6(e), a $PtO_2$ layer can be hetero-epitaxially grown on the $CeO_2$ particles, that are formed earlier by being evaporated at a lower position and having been condensed, serving a substrate, so that the compound powder of $CeO_2$ having predetermined ratio of Pt coverage and the state of coverage (coating layer or ultra-fine particles), namely the catalyst particles of this embodiment can be made.

The compound powder of $CeO_2$ that has been evaporated deposits selectively on the surface of the substrate 17, not on the inner wall of the vacuum chamber 10, as the substrate 17 is cooled by the cooling medium, and is immediately scraped off by a powder scraper 19, so as to be transferred into a pressure forming chamber 20 without being exposed to air.

When the evaporation is complete, the compound powder of $CeO_2$ is subjected to uniaxial compression in the pressure forming chamber 20. Pressure to be applied is from 100 kPa to 1000 MPa, and is preferably in a range from 1 MPa to 10 MPa, as an excessively high pressure decreases the surface area.

Thus $CeO_2/PtO_2$ pellets comprising $CeO_2$ (base particles 1) covered by $PtO_2$ (surface coating layer 2) can be made. This material is annealed in vacuum or reducing atmosphere so as to reduce $CeO_2$, thereby to obtain Pt-coated $CeO_2$ pellets that are $CeO_2$ (base particles 1) coated with Pt (surface coating layer 2).

Reduction is carried out under $5.0 \times 10^{-3}$ Torr or higher vacuum (preferably $1.0 \times 10^{-7}$ Torr or higher vacuum) at a temperature of 200° C. or higher or a period of 10 minutes for longer, in the case of vacuum annealing. In the case of annealing in reducing atmosphere, for example a hydrogen atmosphere, annealing is carried out at a temperature of 150° C. or higher for a period of 10 minutes or longer while supplying hydrogen (high-purity gas of 99.9% or higher) at a rate of 100 ml/min. These conditions (temperature, duration, etc.) vary depending on the size and shape of the sample, as a matter of course.

The catalyst particles of this embodiment can be satisfactorily manufactured, as described above, by employing the concurrent evaporation process wherein two or more kinds of raw material are evaporated at the same time in the vacuum chamber 10, thereby forming the base particles 1 coated with the surface coating layer 2, or the ultra-fine particles, at least on a part of the surface thereof.

Now the embodiment of the catalyst particles according to the invention will be described below together with comparative examples. The catalyst provided by the invention comprises noble metal particles of a nano-order size coated with a noble metal with a thickness of one to thirty atom layers, applicable in very broad areas such as exhaust gas purification, environment protection and fuel cells, and is not limited to the examples described herein.

Catalyst particles of Examples 1 to 6 described below were fabricated by the concurrent evaporation process.

EXAMPLE 1

Fine $CeO_2$ particles coated with Pt in a weight proportion of $CeO_2$: Pt=100:1 were made using metal Ce as the raw material to make the assist catalyst (base particles 1) and $PtO_2$ as the raw material to make the catalyst (surface coating layer 2).

EXAMPLE 2

Fine $CeO_2$ particles coated with Pt in a weight proportion of $CeO_2$: Pt=100:10 were made using metal Ce as the assist catalyst material and $PtO_2$ as the catalyst material.

EXAMPLE 3

Fine $CeO_2$ particles including additive $Al_2O_3$ and coated with Pt in a weight proportion of $CeO_2$: Pt: $Al_2O_3$= 100:10:0.1 were made using metal Ce as the assist catalyst material, $PtO_2$ as the catalyst material and $Al_2O_3$ as the raw material (additive) to make the anti-sintering agent 3.

EXAMPLE 4

Fine $CeO_2$ particles including additive $Al_2O_3$ and coated with Pt in a weight proportion of $CeO_2$: Pt: $Al_2O_3$=100:10:1 were made using metal Ce as the assist catalyst material, $PtO_2$ as the catalyst material and $Al_2O_3$ as the additive.

EXAMPLE 5

Fine $CeO_2$ particles including additive $Al_2O_3$ and coated with Pt in a weight proportion of $CeO_2$: Pt: $Al_2O_3$= 100:10:10 were made using metal Ce as the assist catalyst material, $PtO_2$ as the catalyst material and $Al_2O_3$ as the additive.

EXAMPLE 6

Fine $CeO_2$ particles including additive $Al_2O_3$ and coated with Pt in a weight proportion of $CeO_2$: Pt: $Al_2O_3$= 100:10:25 were made using metal Ce as the assist catalyst material, $PtO_2$ as the catalyst material and $Al_2O_3$ as the additive.

COMPARATIVE EXAMPLE 1

Fine $CeO_2$ particles coated with Pt may be also manufactured by coprecipitation process as another method. When this method is employed, the manufacturing process becomes as follows. A predetermined quantity of water-soluble salts (for example, oxide, nitrate and sulfate) of Ce and Pt are dissolved in pure water or a water-soluble solvent such as ethanol.

A solution of an alkali such as ammonia or sodium hydroxide is dripped little by little in the resultant aqueous solution until pH value of 7 is reached. Concentration of the alkaline solution is preferably as low as possible (0.1 N or less). Hydroxides of Ce and Pt precipitate as soon as the alkali solution is added.

The precipitated hydroxides are filtered with a paper filter. The filtrate is washed in pure water two or three times and is then filtered again to obtain a mixed powder comprising hydroxides of Ce and Pt. This powder is calcinated in air atmosphere (at a temperature from 300 to 1000° C., preferably from 400 to 600° C.), thereby to obtain compound powder consisting of $CeO_2$ and Pt. As a Pt is very easily reduced, a Pt compound is easily reduced when heated to a high temperature even in air, and metal Pt is obtained.

The powder that is made as described above is made up of particles having sizes of nanometer order uniformly mixed, but it is a mere mixture of $CeO_2$ and Pt particles (see FIG. 2), of which bonding strength is lower than that of the embodiment. It is very difficult to control the particle size and mix proportion (composition) and much impurity is included.

The compound powder thus obtained is subjected to uniaxial pressure forming (applied pressure is from 1 to 1000 MPa, preferably from 1 to 10 MPa since an excessively high pressure results in decreased surface area), thereby to make pellets.

In Comparative Example 1, fine $CeO_2$ particles coated with Pt in a weight proportion of $CeO_2$: Pt=100:10 were made using metal $CeCl_3.xH_2O$ as the assist catalyst material and $PtCl_4.5H_2O$ as the catalyst material by the coprecipitation process.

The powders made in Examples 1 to 6 and Comparative Example 1 were subjected to observation of the surface property and evaluation of the performance to neutralize toxic substance.

(Observation of Surface Property)

The fine catalyst particles made in Examples 1 to 6 and Comparative Example 1 were subjected to XRD and TEM analyses to evaluate the particle size and surface configuration.

The analyses showed that the catalyst particles made in Examples 1 to 6 were made of $CeO_2$ particles (base particles) having size of nano-order serving as assist catalyst support, with a part of the surface of the $CeO_2$ particles is covered with thin Pt film (surface coating layer) that has catalytic function having thickness of one to thirty single atom layers (several nanometers).

In the XRD measurement, no impurity peak was detected while the detected peak was sharp, indicating that the fine particles made in Examples 1 to 6 had purities of not lower than 99.9%.

Result of the TEM observation will be described below taking Example 2 as an example. It was found that $CeO_2$ particles having primary particle size of about 5 nm are coated with Pt of thickness about 2 to 3 nm (several atom layers). Similarly to the XRD analysis, the TEM observation also shows that crystal as dense as the lattice arrangement can be observed, is formed. From ICP measurement, it is shown that Ce and Pt exist on the surface in proportion of Ce: Pt=90:10.

In the case of the first comparative example, in contrast, peaks of other materials (impurities) such as starting material are observed in addition to the peaks of $CeO_2$ and Pt, and the purity is about 98%. In the TEM observation, $CeO_2$ particles having primary particle size of about 10 nm are observed, although the surface is not as dense as in the embodiment described above.

Further difference between Examples and Comparative Example is found in the specific surface area of the catalyst particles. The Comparative Example shows a specific surface area of 14.2 $m^2/g$, while Example 2 shows a specific surface area of 83.6 $m^2/g$. Thus it was found that catalyst particles having larger specific surface area and higher activity than the simple noble metal particles of nano-order size of the prior art can be made by Examples.

(Evaluation of Performance to Neutralize Toxic Substance)

In order to verify that the catalyst particles of the embodiments have high activity against toxic gases, pellets formed from the catalyst particles made in Examples 1 to 6 and Comparative Example 1 were tested to evaluate the purification performance.

Pellets 5 mm in diameter were formed from the catalyst particles made in Examples and Comparative Example, and were rushed into particles measuring from 0.85 mm to 1.7 mm across. 5 cc of crushed particles were put into a tube made of quartz glass. With propylene gas supplied from the inlet of the glass tube, the quantity and composition of gas flowing out of the outlet of the glass tube is measured with gas chromatography, thereby to determine the temperature (purifying temperature) at which 50% of propylene is decomposed.

Purifying temperatures measured for the examples are 170° C. in Example 1, 150° C. in the second example, 160° C. in Example 3, 155° C. in Example 4, 170° C. in Example 5, 185° C. in Example 6 and 200° C. in Comparative Example 1. Thus it is confirmed that purification performance achieved by Examples 1 to 6 is greatly improved over that of Comparative Example 1 and shows low-temperature activity.

While the reason for the results described above is not fully elucidated, it is considered to be partly because the specific surface area is increased by the constitution of the catalyst particles due to coating with Pt at a thickness of several atom layers. When compared in the purifying performance at the same temperature, it can be said that the catalyst of the invention can function with a smaller quantity than that of the prior art, and is capable of contributing to a cost reduction.

In Example 6 where larger quantity of the anti-sintering agent ($Al_2O_3$) is added, purification performance is slightly improved but is lower than those of the other embodiments. This is probably because too much added $Al_2O_3$ covers a large part of the Pt layer, resulting in lower activity.

In order to evaluate the stability of the catalyst particles at high temperatures, the purification performance was evaluated by the same method as that described above after the catalyst was left in a furnace of 1000° C. for 24 hours, thereby to determine the temperature (purifying temperature) at which 50% of propylene is decomposed.

Purifying temperatures measured for the examples are 210° C. in Example 1, 205° C. in Example 2, 205° C. in Example 3, 190° C. in Example 4, 190° C. in Example 5, 195° C. in Example 6 and 250° C. in Comparative Example 1.

In Examples 1 and 2 and Comparative Example 1e where the anti-sintering agent $Al_2O_3$ is not added, Pt is sintered when heated to a high temperature, resulting in smaller specific surface area and lower catalytic activity thus leading to lower purification performance. In Example 3 where small amount of the anti-sintering agent is added, too, sintering has occurred indicating that this quantity of addition cannot achieve sufficient effect of preventing sintering.

In Examples 4 to 6, in contrast, a small decrease occurs in the purification performance even after being left at high temperatures due to the presence of the anti-sintering agent, thus achieving such a surface structure that can endure high temperatures.

What is claimed is:

1. Catalyst particles comprising:
    base particles that consist of one kind of single material fine particles or a solid solution fine particles composed of two or more kinds of the single material having a primary particle size of 100 nm or less; and
    one or more kind of metal or a derivative thereof that covers at least a part of the surface of said base; wherein
        the one or more kind of metal or a derivative thereof that covers at least part of the surface of said base particles consists of ultra-fine particles having a size of less than 50 nm.

2. The catalyst particles according to claim 1, wherein said base particles is made of a material selected from among a metal oxide, metal carbide and carbon material.

3. The catalyst particles according to claim 2, wherein said metal oxide is one kind of single material selected from among oxides of Ce, Zr, Al. Ti, Si, Mg, W and Sr and derivatives thereof, or solid solution composed of two or more kinds of the single material.

4. The catalyst particles according to claim 2, wherein said metal carbide is SiC or a derivative thereof.

5. The catalyst particles according to claim 2, wherein said carbon material is graphite.

6. The catalyst particles according to claim 1, wherein the one or more kind of metal or a derivative thereof that covers at least part of the surface of said base particles consists of a coating layer having thickness of one to thirty single atom layers.

7. The catalyst particles according to claim 1, wherein the one or more kind of metal or a derivative thereof that covers at least part of the surface of said base particles has a 99% or higher purity.

8. The catalyst particles according to claim 1, wherein part of the surface of said base particles, but not the entire surface thereof, is covered with said one or more kind of metal or a derivative thereof.

9. The catalyst particles according to claim 1, wherein said one or more kind of metal or a derivative thereof is one or more kind of single material selected from among Pt, Rh, Pd, Au, Ag and Ru and oxides thereof, or solid solution composed of two or more kinds of the signal material.

10. The catalyst particles according to claim 1, wherein said base particles have an anti-sintering agent, that is made of a metal or a metal oxide having melting point of 1500° C. or higher, deposited on the surface thereof.

11. The catalyst particles according to claim 10, wherein said anti-sintering agent consists of one to thirty single atom layers.

12. The catalyst particles according to claim 10, wherein said anti-sintering agent consists of ultra-fine particles having a particle size smaller than 50 nm.

13. The catalyst particles according to claim 10, said anti-sintering agent is made of one kind of single material selected from among oxides of Al, Mg, Ca, Ce, Sr, Zn, W and Mo and derivatives thereof, or solid solution composed of two or more kinds of the single material.

14. The catalyst particles according to claim 10, wherein said anti-sintering agent exists in a proportion of a 1 to 20% by weight of the one or more kind of metal or a derivative thereof that covers at least a part of the base particles.

15. A method of manufacturing the catalyst particles of claim 1, wherein two or more kinds of raw material are evaporated simultaneously in a vacuum chamber, so as to form said base particles of which the surface is at least partially covered with said one or more kind of metal or a derivative thereof.

16. The method of manufacturing the catalyst particles according to claim 15, wherein an evaporation source of the raw material that makes said one or more kind of metal or a derivative thereof is located at a position higher than an evaporation source of the raw material that makes said base particles in said vacuum chamber.

17. The method of manufacturing the catalyst particles according to claim 15, wherein the method of evaporating said raw materials is a resistive heating process.

* * * * *